Patented Apr. 12, 1938

2,113,814

UNITED STATES PATENT OFFICE 2,113,814

PROCESS FOR MAKING CARBOXYLIC ACIDS FROM NITROHYDROCARBONS

Samuel B. Lippincott, Terre Haute, Ind., assignor to Commercial Solvents Corporation, Terre Haute, Ind., a corporation of Maryland No Drawing. Application June 14, 1937,
Serial No. 148,169

7 Claims. (Cl. 260—112)

My invention relates to the production of carboxylic acids. More specifically, my invention relates to the production of carboxylic acids from primary nitrohydrocarbons.

The primary nitrohydrocarbons may be obtained according to a number of different reactions, but are most economically produced by vapor phase nitration of saturated hydrocarbons in accordance with the process of U. S. Patent 1,967,667 by H. B. Hass, E. B. Hodge and B. M. Vanderbilt. The nitroparaffins produced by this process from petroleum hydrocarbons constitute an advantageously cheap source of aliphatic compounds for the production of organic chemicals. I have now found that carboxylic acids may be produced from these nitrohydrocarbons with consistently satisfactory yields and conversions, by reacting the nitrohydrocarbons with certain halogenated acids under the controlled conditions hereinafter set forth.

The process of my present invention may be briefly described as comprising subjecting the primary nitrohydrocarbon, preferably at a temperature of 100° C. to 160° C., to the action of at least one mol. of an alpha-halogenated fatty acid containing from 2 to 4 carbon atoms, per mol. of nitrohydrocarbon, the initial concentration of said acid preferably being at least 80% by weight, and providing either initially or at a later stage of the reaction at least 1 mol. of water per mol. of nitrohydrocarbon to complete the conversion to the carboxylic acid stage. According to this reaction 1 mol. of hydroxylamine is formed for each mol. of carboxylic acid produced, but in the presence of the halogenated fatty acid the hydroxylamine tends to decompose to ammonia and other products. The hydroxylamine remaining in the final reaction mixture is, of course, in the form of a salt, which may be separated from the carboxylic acid and unreacted materials in any suitable manner. The carboxylic acid may be recovered from the reaction mixture according to known methods such as distillation or extraction.

The nitrohydrocarbons which are suitable for my process constitute the primary nitrohydrocarbons as, for example, the primary nitroparaffins, and the aryl or cycloalkyl substituted primary nitroparaffins such as phenyl-nitromethane or 1-nitro-2-cyclohexyl-ethane. The primary nitroparaffins containing two or more carbon atoms are particularly suited for use in my process. Among the nitroparaffins, nitroethane, 1-nitropropane, 1-nitrobutane, and 1-nitro-2-methyl propane are particularly advantageous in that their boiling points constitute suitable reaction temperatures, and the reaction mixture may thus be simply refluxed to effect the conversion. It should be distinctly understood, however, that my invention is not to be limited to any particular nitrohydrocarbons of this series, but is generally applicable to all nitrohydrocarbons containing the group $-CH_2.NO_2$.

The acids which may be used to effect the conversion of the nitrohydrocarbons in my process may be any alpha-halogenated fatty acid containing from 2 to 4 carbon atoms. Among such acids may be mentioned monochloracetic, dichloracetic, dibromacetic, trichloracetic, alpha-chlorpropionic, alpha-beta-dichlorpropionic, alpha-alpha-dibrompropionic, and alpha-alpha-dichlorbutyric. It will be evident, of course, that although any of these alpha-halogenated fatty acids will serve to effect the conversion of the nitrohydrocarbon into the corresponding carboxylic acid, some of these acids will be less advantageous than others. Thus, I have found that some of these acids are less active than others, and must be employed in greater amounts, relative to the nitrohydrocarbon, to secure the desired degree of conversion. It will also be evident that operating conditions will govern the choice of the acid to be used as the converting agent. For example, if a relatively high reaction temperature is to be employed, acids such as trichloracetic, which have some tendency to be decomposed under the conditions of this reaction, should preferably not be employed. In view of these considerations, I prefer to utilize dichloracetic acid, but it should be distinctly understood that my invention is not to be limited to the use of this or any of the other acids mentioned above. Any alpha-halogenated fatty acid containing from 2 to 4 carbon atoms may be employed, and one skilled in the art can readily choose a suitable acid for the particular reaction conditions to be employed.

I have found that the reaction of the present invention proceeds most rapidly with very concentrated acid solutions, but that the reaction will not proceed to completion unless 1 mol. of water per mol. of nitrohydrocarbon is provided in the reaction mixture. For example, when employing anhydrous acids, a final conversion of nitrohydrocarbon to carboxylic acids of the order of 50% is obtained; but optimum conversion may then be secured by introducing 1 mol. of water per mol. of nitrohydrocarbon, and continuing the reaction until the intermediate products are completely transformed to the carboxylic acid stage. This final conversion usually requires only from 5 to 15 minutes at the reaction temperature. Alternatively, the additional water may be introduced in a subsequent recovery operation, as, for example, in a steam distillation. By the use of anhydrous or very concentrated acid, it is thus possible to accelerate the first stage of the reaction with resulting decrease in the overall reaction time. The reaction is strongly exothermic, however, and the high reaction velocity secured by the use of very concentrated acids may cause difficulty unless adequate cooling means are provided. For this reason it may be desirable to utilize an acid solution containing a substantial amount of water, even though a lower rate of conversion is thus obtained. In general, it may be said that the preferred acid concentration is that which will give rise to a rapid conversion rate without unduly rapid evolution of heat, and which will be sufficiently miscible with the nitrohydrocarbon to insure ease of reaction. An acid of 80% to 100% concentration will usually be found to be satisfactory, and preliminary experiments will readily determine the optimum concentration for any particular acid under the reaction conditions to be employed.

The reaction temperature is preferably maintained between 100° C. and 160° C. At temperatures lower than 100° C. the reaction velocity tends to become unsatisfactorily low, and at temperatures above 160° C. there is an increased tendency for decomposition reactions to take place. It will be evident, however, that higher temperatures may be suitably employed if the time of reaction is reduced sufficiently to avoid undue decomposition of the products. In a continuous process, for example, higher temperatures may be used in certain cases by increasing the space velocity in the reaction zone to a point at which the decomposition reactions proceed only to a very slight extent.

My invention may be illustrated by the following specific examples in which various nitrohydrocarbons are converted to the corresponding carboxylic acids by the use of a number of different types of acids as converting agents.

*Example I*

A reaction mixture comprising 89 parts by weight of 1-nitropropane and 129 parts of dichloracetic acid was refluxed with stirring for approximately 7 hours. At the end of this period, 18 parts of water was introduced, and the mixture was further refluxed for 10 minutes. The following results were secured:

| Product | Yield based on nitropropane reacted | Conversion based on nitropropane introduced |
|---|---|---|
| Propionic acid | 92% | 92% |

*Example II*

A reaction mixture comprising 89 parts by weight of 1-nitropropane and 163 parts of trichloracetic acid was refluxed with stirring for 7 hours. At the end of this period, 18 parts of water was added, and the mixture was further refluxed for 10 minutes. The following results were secured:

| Product | Yield based on nitropropane reacted | Conversion based on nitropropane introduced |
|---|---|---|
| Propionic acid | 43% | 26% |

*Example III*

A reaction mixture comprising 89 parts by weight of 1-nitropropane and 94 parts of monochloracetic acid was refluxed for 7 hours. At the end of this period, 18 parts of water was added, and the mixture was further refluxed for 10 minutes. The following results were secured:

| Product | Yield based on nitropropane reacted | Conversion based on nitropropane introduced |
|---|---|---|
| Propionic acid | 74% | 70% |

It is to be understood, of course, that the above examples are illustrative only, and that my invention is not to be construed as limited to the particular materials or procedures set forth. Numerous modifications of procedure will naturally occur to those skilled in the art, and my invention includes any such modifications or the use of any obvious equivalents. For example, as has previously been mentioned, the reaction may be carried out under super-atmospheric pressure, and by increasing the pressure a higher reaction temperature may be secured in the case of the lower boiling nitrohydrocarbons, such as nitroethane. In general, it may be said that a pressure should be employed which will insure liquid phase conditions at the reaction temperature utilized. Likewise, it will be evident that my invention can be carried out in a continuous manner by employing a reaction tube or vessel maintained at the desired reaction temperature, and passing the reaction mixtures through the heated zone at a space velocity sufficient to effect the desired reaction and minimize decomposition reactions. It will also be apparent that my process is applicable to the treatment of mixtures of nitrohydrocarbons as well as single compounds, and to the use of mixed acids as the converting agents, as well as the single acids employed in the above examples. All such modifications which are not excluded by the scope of the appended claims are to be considered as included in my invention.

My invention now having been described, what I claim is:

1. A process for the production of carboxylic acids from primary nitrohydrocarbons, which comprises subjecting the hydrocarbon to the action of at least an equimolecular amount of an alpha-halogenated fatty acid containing from 2 to 4 carbon atoms, and providing at least 1 mol. of water per mol. of nitrohydrocarbon to complete the conversion to the carboxylic acid stage.

2. A process for the production of fatty acids from primary nitroparaffins, which comprises subjecting the nitroparaffin at a temperature in excess of 100° C. to the action of at least an equimolecular amount of an alpha-halogenated fatty acid containing from 2 to 4 carbon atoms, the initial concentration of said acid being at least 80% by weight, and providing at least 1 mol. of water per mol. of nitroparaffin to complete the conversion to the carboxylic acid stage.

3. A process for the production of fatty acids from primary nitroparaffins, which comprises subjecting the nitroparaffin at a temperature of 100° C. to 160° C. to the action of at least an equimolecular amount of an alpha-halogenated fatty acid containing from 2 to 4 carbon atoms, the concentration of said acid being such that there is present in the reaction mixture approximately 1 mol. of water per mol. of nitroparaffin.

4. A process for the production of fatty acids from primary nitroparaffins, which comprises subjecting the nitroparaffin at a temperature of 100° C. to 160° C. to the action of at least an equimolecular amount of monochloracetic acid, the initial concentration of said acid being at least 80% by weight, and providing at least 1 mol. of water per mol. of nitroparaffin to complete the conversion to the carboxylic acid stage.

5. A process for the production of fatty acids from primary nitroparaffins, which comprises subjecting the nitroparaffin at a temperature of 100° C. to 160° C. to the action of at least an equimolecular amount of dichloracetic acid, the initial concentration of said acid being at least 80% by weight, and providing at least 1 mol. of water per mol. of nitroparaffin to complete the conversion to the carboxylic acid stage.

6. A process for the production of fatty acids from primary nitroparaffins, which comprises subjecting the nitroparaffin at a temperature of 100° C. to 160° C. to the action of at least an equimolecular amount of trichloracetic acid, the initial concentration of said acid being at least 80% by weight, and providing at least 1 mol. of water per mol. of nitroparaffin to complete the conversion to the carboxylic acid stage.

7. A process for the production of fatty acids from primary nitroparaffins, which comprises reacting the nitroparaffin at a temperature of 100° C. to 160° C. with at least an equimolecular amount of substantially anhydrous dichloracetic acid, and subsequently introducing at least 1 mol. of water per mol. of nitroparaffin and continuing the reaction to complete the conversion to the carboxylic acid stage.

SAMUEL B. LIPPINCOTT.